(12) United States Patent
Liu

(10) Patent No.: US 9,156,413 B2
(45) Date of Patent: Oct. 13, 2015

(54) FIXING MOUNT OF BICYCLE CARRIER

(71) Applicant: Yao-Huang Liu, Tainan (TW)

(72) Inventor: Yao-Huang Liu, Tainan (TW)

(*) Notice: Subject to any disclaimer, the term of this patent is extended or adjusted under 35 U.S.C. 154(b) by 103 days.

(21) Appl. No.: 14/149,855

(22) Filed: Jan. 8, 2014

(65) Prior Publication Data

US 2015/0191128 A1    Jul. 9, 2015

(51) Int. Cl.

| B60R 9/00 | (2006.01) |
|---|---|
| B60R 11/00 | (2006.01) |
| B60R 7/00 | (2006.01) |
| B60R 9/10 | (2006.01) |
| B60R 9/08 | (2006.01) |
| B60R 9/06 | (2006.01) |
| B60R 9/02 | (2006.01) |

(52) U.S. Cl.
CPC ... *B60R 9/10* (2013.01); *B60R 9/02* (2013.01); *B60R 9/06* (2013.01); *B60R 9/08* (2013.01); *B60R 11/00* (2013.01)

(58) Field of Classification Search
CPC ............. B60R 9/08; B60R 9/02; B60R 9/06; B60R 9/10; B60R 11/00
USPC ......... 224/568, 567, 534, 535, 536, 570, 571, 224/924
See application file for complete search history.

(56) References Cited

U.S. PATENT DOCUMENTS

| 6,286,738 B1 * | 9/2001 | Robins et al. ................. 224/314 |
| 6,336,580 B1 * | 1/2002 | Allen et al. .................... 224/532 |
| 6,386,407 B1 * | 5/2002 | Erickson et al. .............. 224/282 |
| 6,516,986 B1 * | 2/2003 | Lassanske et al. ........... 224/533 |
| 6,616,023 B1 * | 9/2003 | Dahl et al. .................... 224/537 |
| 6,772,927 B2 * | 8/2004 | Bogoslofski .................. 224/324 |
| 6,988,645 B1 * | 1/2006 | Nusbaum et al. ............. 224/519 |
| 7,213,731 B1 * | 5/2007 | Kolda ............................ 224/537 |
| 7,469,808 B2 * | 12/2008 | Morales et al. ............... 224/555 |
| D612,320 S * | 3/2010 | Flaherty et al. .............. D12/408 |
| D624,004 S * | 9/2010 | Farber .......................... D12/408 |
| D634,258 S * | 3/2011 | Farber .......................... D12/408 |
| D634,259 S * | 3/2011 | Farber .......................... D12/408 |
| D635,087 S * | 3/2011 | Flaherty et al. .............. D12/408 |
| D647,452 S * | 10/2011 | Laverack et al. ............ D12/408 |
| D659,631 S * | 5/2012 | Laverack et al. ............ D12/408 |
| 8,220,678 B2 * | 7/2012 | Bove et al. .................... 224/324 |
| 8,220,681 B2 * | 7/2012 | Farber .......................... 224/532 |
| 8,348,113 B2 * | 1/2013 | Huang ........................... 224/567 |
| 8,602,279 B2 * | 12/2013 | Sautter et al. ................ 224/506 |
| 2005/0035168 A1 * | 2/2005 | Prescott et al. .............. 224/503 |
| 2006/0091173 A1 * | 5/2006 | Morales et al. .............. 224/555 |
| 2007/0057001 A1 * | 3/2007 | Wang ............................ 224/536 |
| 2007/0235487 A1 * | 10/2007 | Bogoslofski et al. ......... 224/533 |
| 2008/0093404 A1 * | 4/2008 | Clausen et al. ............... 224/519 |
| 2009/0120986 A1 * | 5/2009 | Sautter et al. ................ 224/497 |

* cited by examiner

*Primary Examiner* — Justin Larson
*Assistant Examiner* — Lester L Vanterpool
(74) *Attorney, Agent, or Firm* — Alan D. Kamrath; Kamrath IP Lawfirm, P.A.

(57) ABSTRACT

A fixing mount of a bicycle carrier contains a support rod of a bicycle carrier, a body, at least one cable tie, a connector, and a retainer. The body includes a large-diameter end, a through hole, and a small-diameter end. The large-diameter end has a first arcuate supporting face, a second arcuate supporting face and a third arcuate supporting face. The small-diameter end has a locking groove, and the body also includes plural locking elements. The connector includes a recess, a convex bottom surface, two coupling tabs, and each coupling tab has a concaved top surface and an aperture. The connector further includes plural first extending pieces, and each first extending piece has a first pore. Between any two adjacent extending blocks is defined a notch. The retainer includes at least one second extending piece and a plurality of pegs, and each extending piece has a second pore.

1 Claim, 6 Drawing Sheets

FIXING MOUNT OF BICYCLE CARRIER

FIELD OF THE INVENTION

The present invent relates to a fixing mount, and more particularly to a fixing mount of a bicycle carrier which ties a bicycle frame of the bicycle and ties a rear rack of the bicycle by ways of a retainer so as to fix the bicycle on the bicycle carrier securely.

BACKGROUND OF THE INVENTION

A conventional fixing mount of a bicycle carrier only contains a supporting face to support a bicycle frame. However, each bicycle frame has a varying size, so such a conventional fixing mount cannot applicable for each bicycle frame with a varying size.

SUMMARY OF THE INVENTION

The primary object of the present invention is to provide a fixing mount of a bicycle carrier which ties a bicycle frame of the bicycle and ties a rear rack of the bicycle by ways of a retainer so as to fix the bicycle on the bicycle carrier securely.

Further object of the present invention is to provide a fixing mount of a bicycle carrier which is applicable for each bicycle frame with a varying size so as to save use cost Another object of the present invention is to provide a fixing mount of a bicycle carrier which contains a body, and the body includes three supporting faces and a locking groove so as to hold and fit the bicycle fame and the rear rack of the bicycle in a varying positioning manner.

DETAILED DESCRIPTION OF THE PREFERRED EMBODIMENTS

Figure 1:
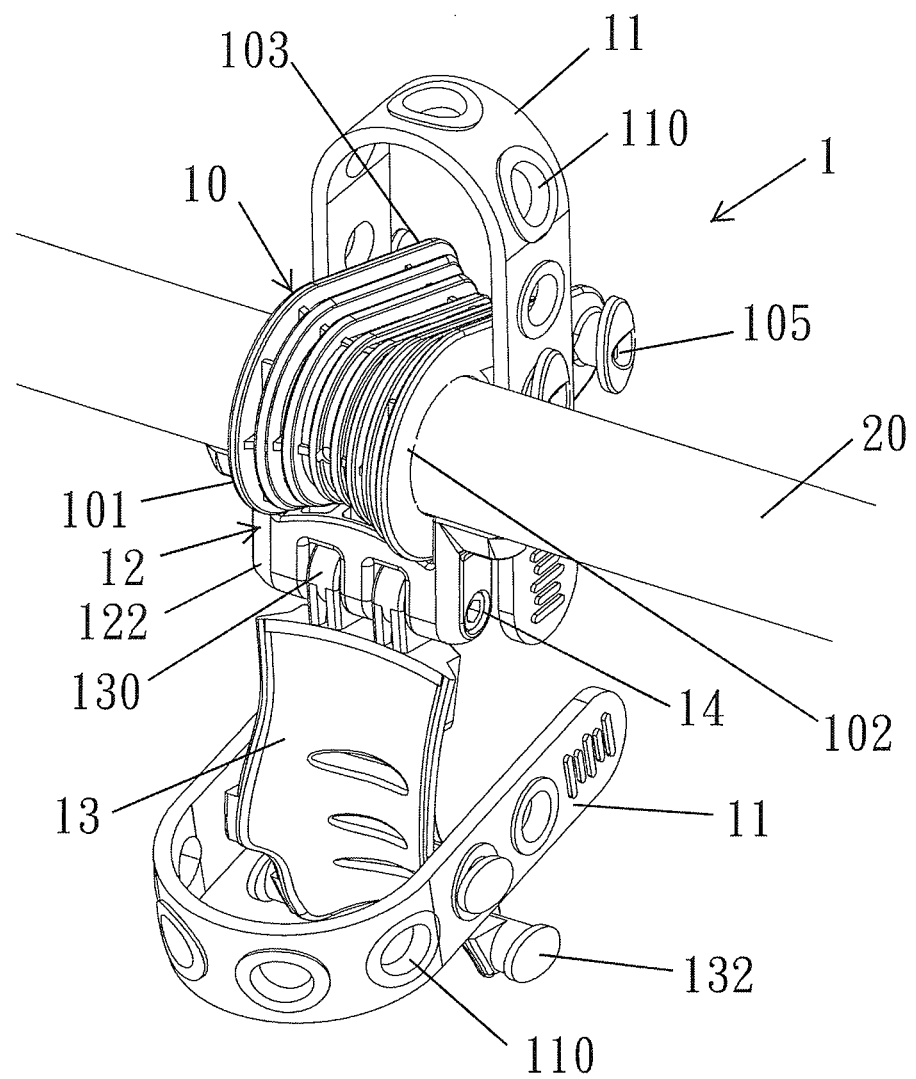
FIG. 1 is a perspective view showing the assembly of a fixing mount of a bicycle carrier according to a preferred embodiment of the present invention.
Figure 2:
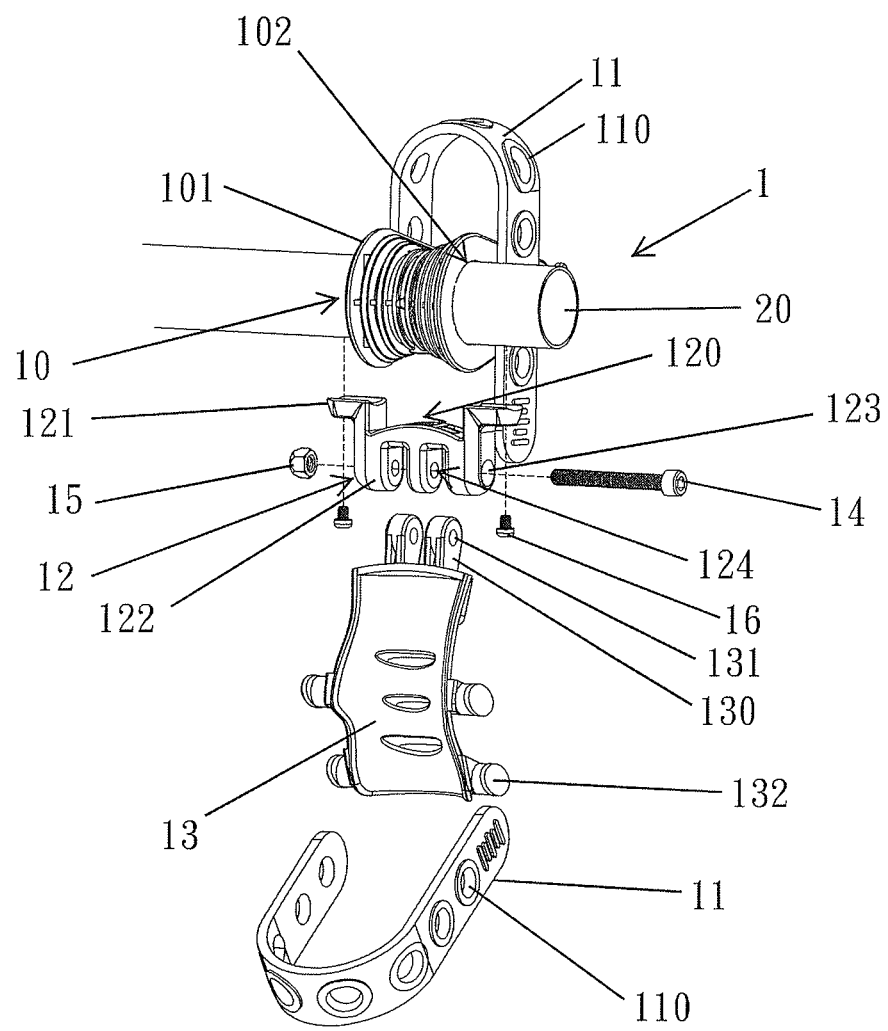
FIG. 2 is a perspective view showing the exploded components of the fixing mount of the bicycle carrier according to the preferred embodiment of the present invention.
Figure 3:
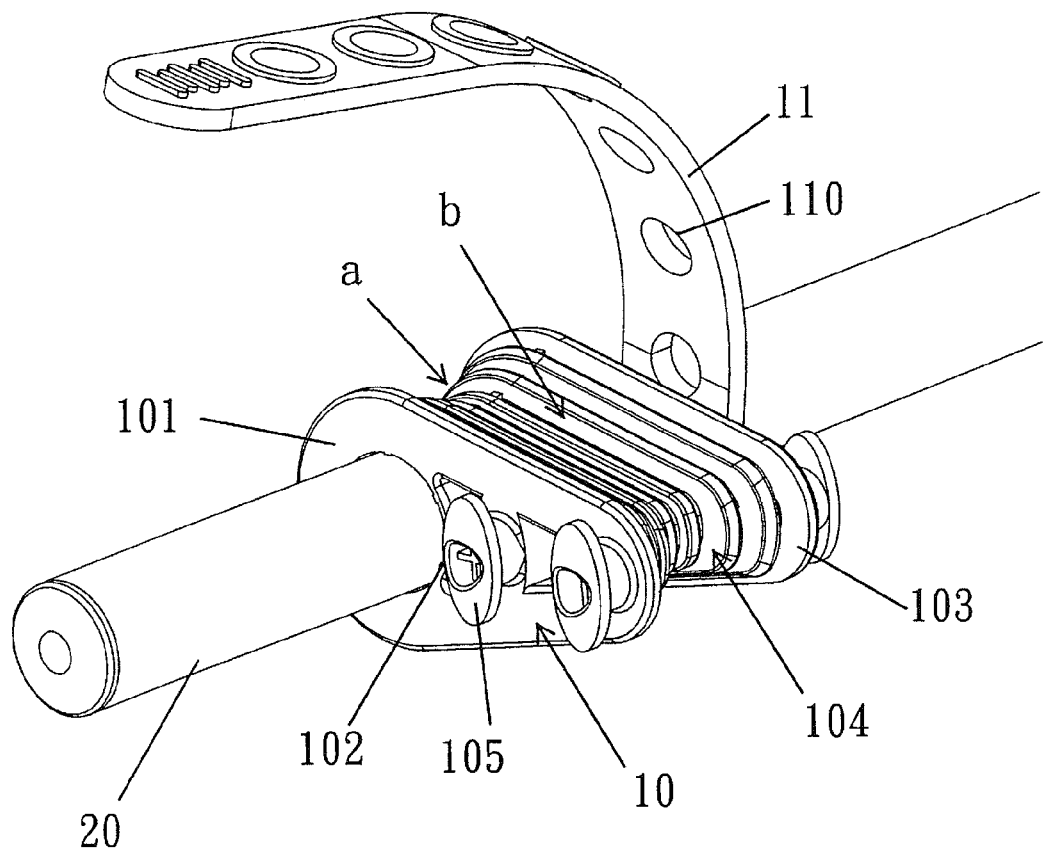
FIG. 3 is a perspective view showing the assembly of a body, a cable tie and a support rod of the fixing mount of the bicycle carrier according to the preferred embodiment of the present invention.
Figure 4:
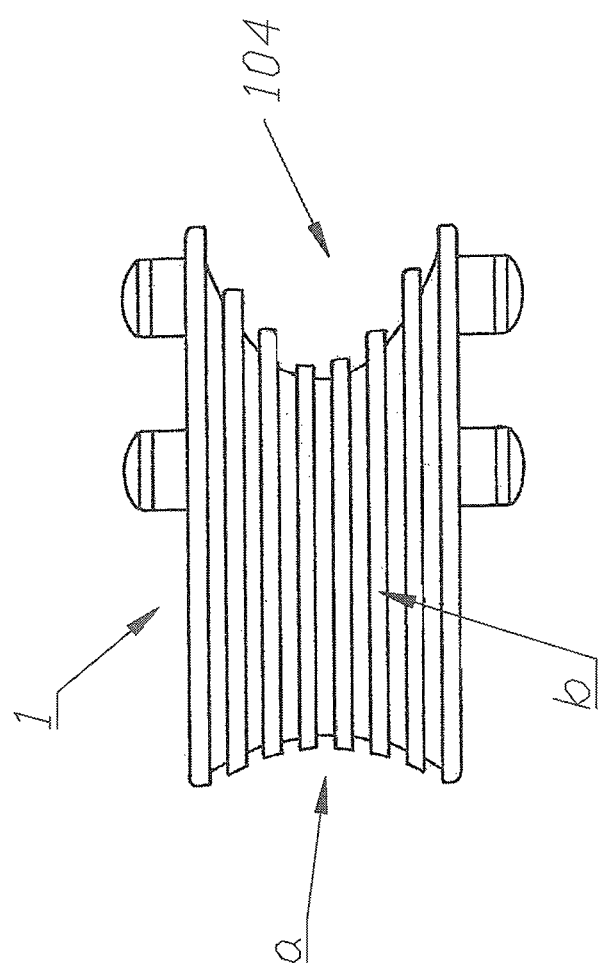
FIG. 4 is a top plan view showing the assembly of the fixing mount of the bicycle carrier according to the preferred embodiment of the present invention.
Figure 5:
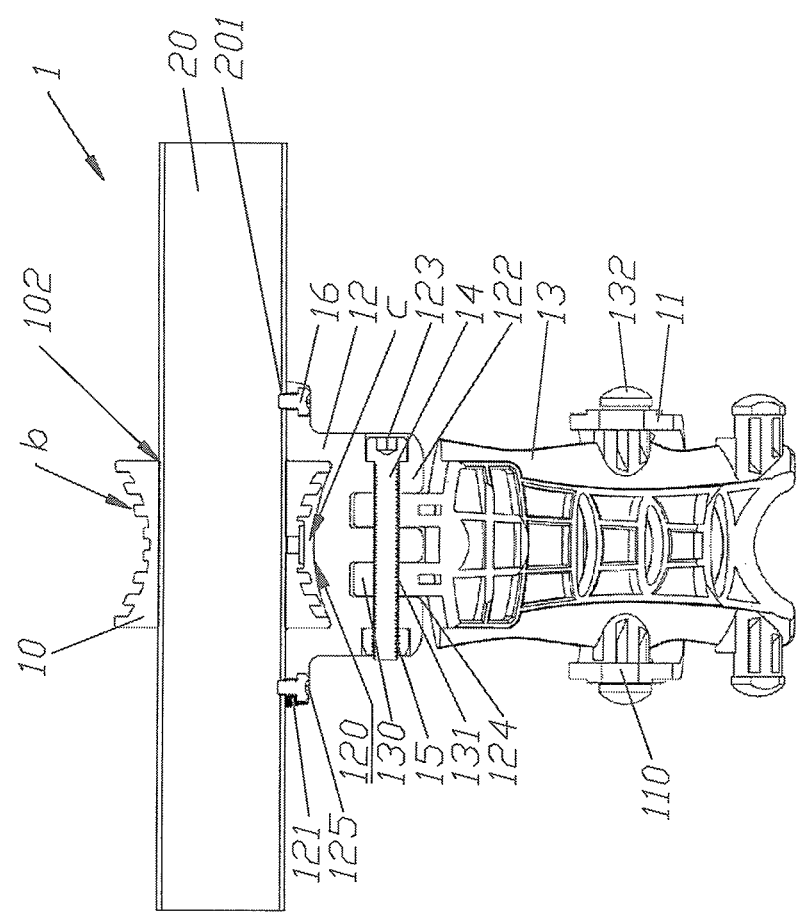
FIG. 5 is a cross sectional view showing the assembly of the fixing mount of the bicycle carrier according to the preferred embodiment of the present invention.

With reference to FIGS. 1-5, a fixing mount of a bicycle carrier comprises a body 10, at least one cable tie 11, a connector 12, and a retainer 13.

The body 10 includes a large-diameter end 101, a through hole 102 passing through the large-diameter end 101, and a small-diameter end 102 opposite to the large-diameter end 101, wherein the large-diameter end 101 has a first arcuate supporting face a, a second arcuate supporting face b, and a third arcuate supporting face c formed on an end wall, an upper wall and a lower wall thereof and extending to the small-diameter end 103. The first arcuate supporting face a, the second arcuate supporting face b and the third arcuate supporting face c are a toothed surface so as to contact with a bicycle tightly. The small-diameter end 103 of the body 10 has a locking groove 104 for retaining with a bicycle frame, and the body 10 also includes a plurality of locking elements 105 disposed thereon and locking with a plurality of orifices 110 of the at least one cable tie 11. The connector 12 is concaved and includes a recess 120 defined on a top surface thereof and a convex bottom surface for cooperating with the third arcuate supporting face c of the body 10. The connector 12 also includes two coupling tabs 121 arranged on two sides thereof, and each coupling tab 121 has a concaved top surface for coupling with a support rod 20 of a bicycle carrier and has an aperture 125 for connecting with an opening 201 of a bottom end of the support rod 20. The connector 12 further includes a plurality of first extending pieces 122 extending outwardly from a bottom end thereof, and each first extending piece 122 has a first pore 123 formed thereon, between any two adjacent extending blocks 122 is defined a notch 124. The retainer 13 includes at least one second extending piece 130 formed on a first end thereof, and each of the at least one second extending piece 130 is inserted into the notch 124 and has a second pore 131 formed thereon. The retainer 13 also includes a plurality of pegs 132 fixed on two sides of a second end thereof and retained into the plurality of orifices 110 of the at least one cable tie 11.

In assembly, each of the at least one second extending piece 130 of the retainer 13 is inserted into the notch 124 of the connector 12, and the second pore 131 is aligned with the first pore 123 of each first extending piece 122 of the connector 12, then a screw bolt 14 is screwed with a nut 15 via the first pore 123 and the second pore 131. Thereafter, the body 10 is placed into the recess 120 of the connector 12, such that the recess 120 and the two coupling tabs 121 of the connector 12 are joined with the body 10 and the support rod 20, and the aperture 125 of each coupling tab 121 is aligned with the opening 201 of the support rod 20 so that at least one screwing element 16 is screwed with the fixing mount 1 of the bicycle carrier via the aperture 125 and the opening 201.

Figure 6:
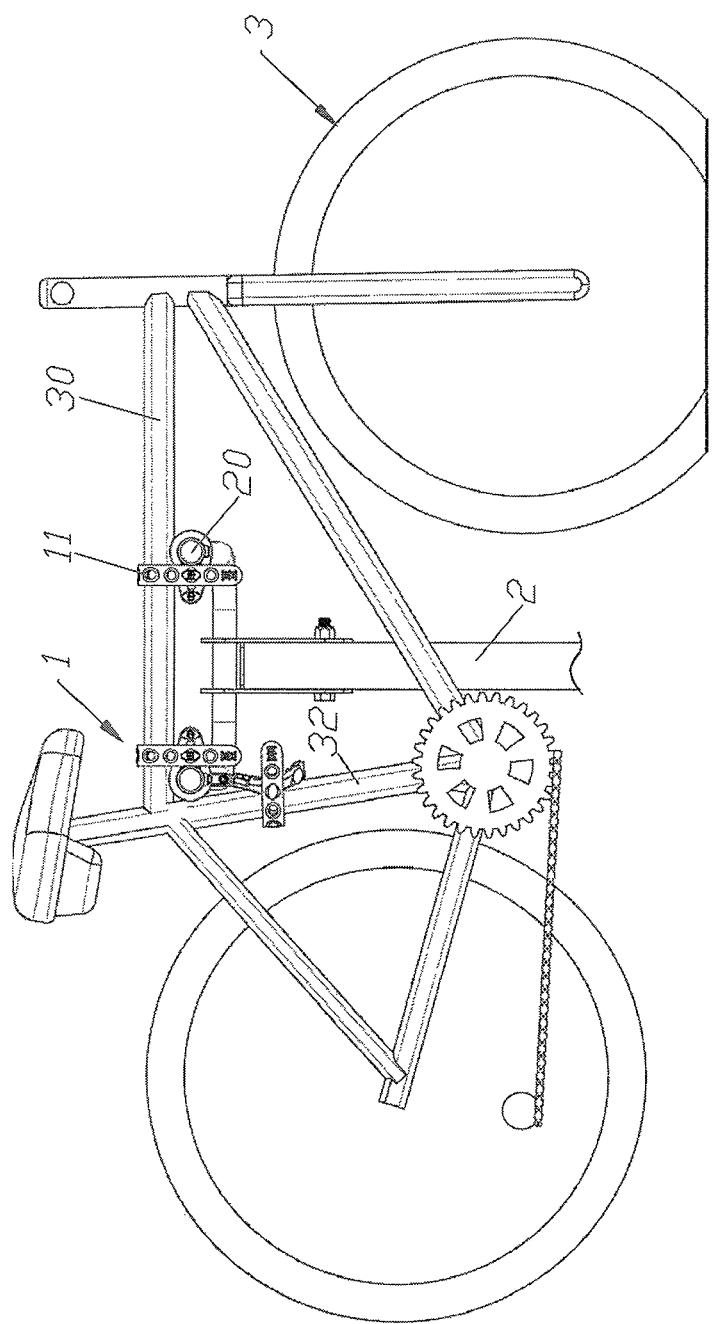
FIG. 6 is a plan view showing the application of the fixing mount of the bicycle carrier according to the preferred embodiment of the present invention.

In operation, as shown in FIG. 6, the body 10 is fitted on the support rod 20 of the bicycle carrier 2 by ways of the through hole 102 and is adjustably fixed on a predetermined position of the support rod 20. Thereafter, the bicycle frame 30 of the bicycle 3 is biased against the second arcuate supporting face b or the third arcuate supporting face c of the body 10 so as to position the bicycle frame 30 of the bicycle 3, and after the retainer 13 abuts against a rear rack 32 of the bicycle 2, the at least one cable tie 11 is tied on the rear rack 32 of the bicycle 6 securely.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fixing mount of a bicycle carrier comprising: a support rod of a bicycle carrier, a body, at least one cable tie, a connector, and a retainer;

the body including a large-diameter end, a through hole for inserting the support rod of the bicycle carrier, and a small-diameter end opposite to the large-diameter end, the large-diameter end having a first arcuate supporting face, a second arcuate supporting face and a third arcuate supporting face formed on an end wall, an upper wall and a lower wall thereof and extending to the small-diameter end, the first arcuate supporting face, the second arcuate supporting face and the third arcuate supporting face being a toothed surface, the small-diameter end having a locking groove for retaining with a bicycle frame, and the body also including a plurality of locking elements disposed thereon and locking with a plurality of orifices of the at least one cable tie; characterized in that:

the connector is concaved and includes a recess defined on a top surface thereof and a convex bottom surface for cooperating with the third arcuate supporting face of the body, the connector also includes two coupling tabs arranged on two sides thereof, and each coupling tab has a concaved top surface for coupling with the support rod of the bicycle carrier and has an aperture for connecting with an opening of a bottom end of the support rod, the connector further includes a plurality of first extending pieces extending outwardly from a bottom end thereof, and each first extending piece has a first pore formed thereon, between any two adjacent extending blocks is defined a notch;

the retainer includes at least one second extending piece formed on a first end thereof, and each of the at least one second extending piece is inserted into the notch and has a second pore formed thereon, the retainer also includes a plurality of pegs fixed on two sides of a second end thereof and retained into the plurality of orifices of the at least one cable tie.

\* \* \* \* \*